United States Patent [19]

Steele et al.

[11] Patent Number: 5,175,032

[45] Date of Patent: Dec. 29, 1992

[54] HEAT SHRINKABLE CLOSURE SHEETS AND SLEEVE STRUCTURES AND METHODS EMPLOYING THE SAME

[75] Inventors: Robert E. Steele, Richmond Hill; Michael A. Romano, Hamilton; Dilip K. Tailor, Brampton, all of Canada

[73] Assignee: Shaw Industries Ltd., Rexdale, Canada

[21] Appl. No.: 694,479

[22] Filed: May 2, 1991

[51] Int. Cl.$^5$ .............................................. B32B 7/12
[52] U.S. Cl. ...................................... 428/34.9; 428/57; 428/192; 428/349; 428/913; 428/36.9; 174/DIG. 8; 138/104; 138/155; 156/86; 156/308.4
[58] Field of Search ................. 428/34.9, 35.2, 35.7, 428/55, 77, 78, 913, 347, 349, 192, 36.9, 36.91, 57; 174/DIG. 8; 156/86, 212, 213, 214, 215-218, 308.4, 308.2; 138/89, 155, 104

[56] References Cited

U.S. PATENT DOCUMENTS

| | | | |
|---|---|---|---|
| 3,770,556 | 11/1973 | Evans | 428/77 |
| 4,268,559 | 5/1981 | Smuckler | 428/35.1 |
| 4,472,468 | 9/1984 | Tailor | 428/34.9 |
| 4,533,419 | 8/1985 | Pieslak | 428/57 |
| 4,582,737 | 4/1986 | Torgerson | 428/57 |
| 4,652,490 | 3/1987 | Arita et al. | 428/347 |
| 4,695,491 | 9/1987 | Kondo et al. | 428/349 |
| 4,699,821 | 10/1987 | Hallock | 428/192 |
| 4,738,883 | 4/1988 | Young | 428/349 |
| 4,795,509 | 1/1989 | DeBruycker | 428/34.9 |
| 4,802,509 | 2/1989 | Brandolf | 428/34.9 |
| 4,803,104 | 2/1989 | Peigneur | 428/57 |
| 4,824,726 | 4/1989 | Closson, Jr. | 428/349 |
| 4,961,978 | 10/1990 | Doheny | 428/78 |
| 5,035,955 | 7/1991 | Matsukura | 428/349 |

Primary Examiner—Ellis P. Robinson
Assistant Examiner—Rena Dye
Attorney, Agent, or Firm—Ridout & Maybee

[57] ABSTRACT

A longitudinally heat shrinkable closure sheet has a hold-down adhesive portion adjacent each longitudinal end for application on the exposed end portions a heat shrinkable wrap-around sleeve applied around a pipe or other article to be covered. Heat is applied to the closure sheet in order to weld the adhesive free portion of the underside of the closure sheet to the end portions of wrap-around sleeve. The initial shrinkage of the closure sheet between the hold-down adhesive portions draws it tightly into contact with the upper side of the end portions. Shearing forces are applied between the closure sheet and the end portions firstly as the closure sheet contracts relative to the end portions, and secondly, as the sleeve shrinks, develops hoop stress and stretches the closure sheet, and a high strength fusion bond is achieved between the closure sheet and sleeve.

61 Claims, 2 Drawing Sheets

HEAT SHRINKABLE CLOSURE SHEETS AND SLEEVE STRUCTURES AND METHODS EMPLOYING THE SAME

The present invention relates to closures for protective coverings which may be used in, for example, sealing and protecting pipe weld joints, telephone cables, electrical splices, pipelines and the like, from adverse environmental conditions such as corrosion and moisture.

It is known to use for this purpose heat shrinkable tubular sleeves formed by extrusion. However, there is difficulty in extruding sleeves of any diameter but especially greater than about 12 inches (about 30 cm). The procedures for imparting a heat shrink memory to and for stretching the sleeves are complex and difficult as well.

Another general type of heat shrinkable covering is represented by the so-called "wrap-around sleeve", one example of which is disclosed in U.S. Pat. No. 4,200,676 to D. A. Caponigro. While wrap-around sleeves are more versatile than tubular sleeves in that they can be readily applied to articles, including large diameter pipes, which do not have an accessible exposed end, the known closure systems by which the adjoining ends of the sleeve are interconnected are an inherent source of weakness. Mechanical closure systems are also known but vulnerable to damage, while conventional adhesively bonded overlaps can permit slippage during application and subsequently creep due to the hoop stresses remaining in the shrunk sleeves and so render the sleeves less effective than those which have a continuous covering.

These problems have been largely overcome by the method described in U.S. Pat. No. 4,472,468 in the name Tailor et al dated Sep. 18, 1984 assigned to the assignee of the present application, wherein a hold-down adhesive is used to bond together overlapped ends of a heat fusion bondable shrinkable sheet before applying heat externally by means of a torch in order to fusion bond the ends together. However, the heat shrinkable sheets described in the Tailor et al patent provide limited freedom of choice of design of the welded closure. Moreover, since usually the inner side of the sheet, that is, the side to be laid against the article to be protected, is lined with a functional coating, it is necessary to provide a zone which is free from functional coating on the underside in order to allow fusing of the overlap onto the outer side of the underlap end. This has required the use of a discontinuous method of applying the coating or the masking off of the desired coating free areas of the sheet and then stripping off the masking material together with the coating after performing a continuous coating operation. These procedures are complicated and labour intensive. In addition, a given length of sheet will accommodate only a certain range of girths to be covered and if wasteful use of over-large sheets is to be avoided it is necessary to manufacture and maintain an inventory of sheets of differing lengths. This increases the manufacturing and distribution costs.

The present invention provides a closure for connecting together adjoining end portions of dimensionally heat unstable coverings such as wrap-around sleeves. The closure comprises a fusion bondable longitudinally dimensionally heat unstable flexible sheet having a hold-down adhesive stripe or other portion extending across a transverse zone adjacent each of its longitudinal ends. The closure has an adhesive-free zone between the hold-down adhesive portions Preferably, each hold-down adhesive portion is spaced inwardly from the adjacent end of the closure sheet.

In use, the closure may be applied over the adjoining end portions of the heat shrinkable covering sheet and the hold-down adhesive is used to bond the closure to each end portion of the covering. Upon heating, the adhesive free zone of the closure first adheres to and then welds or fusion bonds to the outer surfaces of the adjoining end portions of the heat shrinkable covering, forming a welded tubular sleeve. Heating is applied to shrink down the heat unstable covering onto the item to be protected.

The closure results in high strength fusion bonds between the closure sheet and a wrap-around covering. Without wishing to be bound by any theory, it is believed that these high strength bonds result firstly from the intimate contact between the underside of the closure sheet and the upper side of the covering sheet that results from the initial shrinking down of closure sheet while it is held to the covering by the hold-down adhesive, and secondly from frictional and shear forces exerted between the closure sheet and covering sheet during the development of the fusion bond. These frictional and shear forces result firstly from movement of the closure sheet and end portions of the covering sheet relative to one another in a first sense as a result of the longitudinal contraction of the closure sheet relative to the end portions on initial heating of the closure sheet and secondly from movement of the closure sheet in an opposite sense relative to the end portions as a result of longitudinal stretching of the closure sheet by the hoop stress developed in the wrap-around covering as this shrinks down.

The invention also provides a sleeve structure comprising a wrap-around covering and a closure. The covering comprises a sheet of dimensionally heat unstable flexible material having longitudinally spaced end portions capable of being overlapped when the covering sheet is applied to an article to be covered. The closure comprises a sheet of flexible material fusion bondable with the covering sheet and having longitudinally spaced end portions. The closure sheet and the covering sheet each have been stretched in the longitudinal direction from an original dimensionally heat stable form to a dimensionally heat unstable form capable of moving in the direction of its original form by the application of heat alone. The closure sheet has two hold-down adhesive portions each extending across a transverse zone adjacent each end portion, and has an adhesive free zone between the hold-down adhesive portions. The closure can be applied over the overlapped end portions of said wrap-around covering sheet with the hold-down adhesive portions adhesively bonded to the end portions of said wrap-around covering sheet so that the closure can be fusion bonded to the upper sides of the end portions of said covering sheet.

Further, the invention provides a method of applying a close fitting protective covering to an article to be covered. The method comprises providing a covering sheet and a closure as described above. The covering sheet is wrapped around a pipe or other article by laying the sheet against the article and juxtaposing its end portions, applying the closure sheet to said covering sheet with its adhesive free zone spanning said end portions and bonding the hold-down adhesive covered portions on the end portions, respectively, heating the closure sheet to effect a fusion bond between the adhesive free zone of the closure sheet and the end portions of the covering sheet, and heating the covering sheet to shrink it into close fitting relation to the article The end portions of the covering sheet may be butted together on the article to be covered, so that the closure sheet bridges between and connects the abutted ends when welded thereto. Preferably, however, the end portions of the covering sheet are overlapped, and the closure sheet is applied so that the adhesive-free zone spans the overlap portion and the exposed upper side of underlap portion adjacent thereto.

It is one advantage of the present arrangement that the closure sheet may differ in character from the covering sheet. For example, it can differ from the sheet material in its dimensional heat stability, its color, chemical composition, degree of crosslinking, thickness or in the method by which it has been crosslinked. The closure sheet can differ from the covering sheet in more than one of the above-mentioned respects. This provides advantages of design of the covering and closure system since the weldability and mechanical and other properties of the weld and closure zone can be tailored to suit the requirements of the application to which the system is to be put.

With prior attempts of which the inventors are aware, wherein two dimensionally heat unstable edges or pieces are welded together, problems have arisen in effecting a satisfactory weld. One of the problems is that of peel back which occurs when two overlapping heat shrinkable sheets are heated. When heat is applied, the outside surface of the overlap tends to recover or shrink before the inside surface and thus there is differential contraction across the thickness of the sheets between the overlap and underlap. When heat is applied from one side only, the heat shrinkable sheet tends to curl upwardly or wrinkle as a result. These problems can be greatly mitigated with the closure sheet, sleeve structure and method of the invention. In one preferred form, the closure sheet has a degree of heat shrinkability which is approximately equal to or less than that of the covering sheet material, typically such that it exhibits on heating a longitudinal shrinkage of about 2% to about 50%, based on the length of the unshrunk closure sheet. When a dimensionally heat stable sheet is heated, it tends to expand in all dimensions, especially with polymeric sheets due to the volumetric increase associated with crystalline melting. With a closure sheet having a degree of longitudinal shrinkage within the range of about 2% to about 25%, based on the length of the unshrunk sheet, the shrinkage can be enough to offset this expansion phenomenon. More preferably, said shrinkage is about 5% to about 20%. The covering sheet material however typically may have a degree of longitudinal shrinkage of about 20% to about 80% based on the length of the unshrunk sheet. At these degrees of shrinkage, peel back, curling and wrinkling are serious problems which can normally be overcome only by use of a high strength and effective hold-down adhesive or a mechanical closure. When the shrinkage in the closure sheet is less than about 20% the demand on the hold down adhesive is reduced substantially, and there is much greater choice in selection of the same. As a result, with the present closure and covering, it is possible when welding the closure sheet to the underlying covering sheet to obtain welded bonds which are uniform and homogeneous. By "uniform" is meant that the weld is of substantially uniform peel strength along its entire length. By "homogeneous" is meant that the area or line of welding between the closure sheet and covering sheet does not present a line of weakness, so that when subjected to shear testing the welded joint does not fail along an interface corresponding to the boundaries of the original closure sheet and covering sheet.

A further respect in which the dimensional stability of the closure sheet may differ from that of the covering sheet is that the closure sheet may commence shrinkage at a temperature different from that of the sheet. Advantageously, the closure sheet may commence to shrink at a temperature lower than the temperature at which the covering sheet commences shrinkage, preferably about 5° C. to about 15° C. lower. For example, the closure sheet may commence shrinkage at about 100° C. and the covering sheet at 110° C. This arrangement has the advantage that it ensures establishment of contact of the closure sheet with the covering sheet before the covering sheet begins to recover its original unstretched dimension. The closure sheet will tend to become tacky at a lower temperature than the covering sheet and hence as the closure sheet shrinks it will form a bond to the covering sheet before shrinkage of the latter commences.

The covering sheet material and closure sheet are preferably organic polymeric materials, the same or different. For example, the material may be a polyolefin, a blend of polyolefins, or a blend of a polyolefin with an olefin copolymer, or with an elastomer, or with a mixture of these. Other polymeric materials which may be useful are elastomers such as butadiene-styrene copolymers, polybutadiene, silicone rubber, polybutene; plasticized polyvinylchloride, thermoplastic polyesters, polyurethanes, ethylene propylene rubbers (EPDM) or blends of selected elastomers with polyolefins commonly referred to as thermoplastic elastomers. The most preferred polymeric materials are the polyolefins, e.g. polyethylenes, polypropylenes, various copolymers of ethylene and propylene, for example ethylene-ethylacrylate or ethylene-vinyl acetate copolymers in which repeat units derived from ethylene comonomer predominate (e.g. about 70% to 97%), and blends of such copolymers with polyethylene.

In advantageous forms of the present sleeve structure and method, the closure sheet is formed of a material chemically different from covering sheet. For example, the covering sheet may be formed from any of the materials noted above and the closure sheet from a polymer chemically structured such that it forms welds very effectively to the above noted sheet materials. Examples of such weld efficient polymers are well known to those skilled in the art. One preferred group of such polymers comprises weld efficient terpolymers of which examples include ethylene-vinyl acetate-methacrylic acid or acrylic acid polymers, EPDM polymers (ethylene-propylene-diene monomer polymers). Further well known examples are the polymers available under the trademark FUSABOND from Dupont Canada which are maleic anhydride modified polyolefins.

Such weld-efficient copolymers or terpolymers may be considerably more costly and less mechanically strong than the polymers typically used to produce the covering sheet. It is therefore advantageous to form the closure sheet, which will usually be about 2 to about 20% the length of the covering sheet, of such weld efficient materials but to form the covering sheet of other polymers selected specifically for their cost and performance properties.

The dimensionally heat unstable closure and covering sheet materials are preferably crosslinked polymeric material. In the case of, for example, a polyolefin or other polymeric dimensionally heat unstable sheet material, the material is preferably cross-linked to a degree of 25% to 85%, more preferably in the range 45% to 70%. In this connection, the degree of crosslinking of a given plastics material is definable by reference to solvent extraction tests conducted under standardized conditions on samples of the plastics. At zero crosslinking a solvent for the plastics will totally dissolve the plastics material, while a material which suffers no weight loss in such tests is regarded as 100% crosslinked. Intermediate degrees of crosslinking are indicated by proportionately intermediate percentage weight losses. For certain applications, it may be desirable that the closure sheet is crosslinked to a degree somewhat higher than the dimensionally heat unstable covering sheet material to which it is to be welded so that it will have good mechanical strength when hot during the procedure of shrinking down a wrap-around sleeve onto the pipe or other article during use of the products. However, especially with covering sheets which are highly crosslinked, it can be advantageous to employ a closure sheet which has a lower degree of crosslinking than the covering sheet. The degree of crosslinking often has a marked effect on the ease with which the weld can be effected. Generally speaking, the lower the degree of crosslinking, the easier and faster the weld can be achieved. However, a low degree of crosslinking in the covering sheet would result in a sleeve which has a sluggish response to heating and is prone to melting and sagging. It is advantageous to be able to compensate for a higher crosslink in the covering sheet by a lower crosslink in the closure sheet in order to promote ease and effectiveness of welding without sacrificing responsiveness of the sleeve to heating.

Advantageously, the method employed to crosslink the closure sheet may be different from that used for the covering sheet material Examples of methods which may be used for crosslinking include exposure to ionizing radiation, blending of the polymer with organic peroxides, and formation of pendant silane groups on the polymer and exposure of the polymer to moisture to crosslink the silane groups. Each of these methods is in itself well known, as are the conditions employed to achieve desired degrees of crosslinking, and need not be described in detail herein. Briefly, exposure to ionizing radiation in order to crosslink polymers is frequently conducted either by exposure of the polymer to gamma rays from radioactive sources such as cobalt-60 or to high energy electrons from electron accelerators. Crosslinking by blending with peroxides comprises blending suitable polymers with selected small quantities of organic peroxides appropriate for the particular polymer to be crosslinked, forming the blend into a sheet, and subsequently raising it to a temperature above that required to decompose the peroxide. Examples of commonly used peroxides include $\alpha$, $\alpha'$-bis (t-butylperoxy) diisopropyl benzene and dicumyl peroxide. Treatment with silane may include grafting a silane such as vinyl silane to a polymer such as an ethylene polymer or copolymerizing a silane, for example a vinylsilane, with an olefin or like monomer. In either case a polymer having pendant silane groups is formed.

The resultant polymer is then crosslinked by exposure to moisture, for example in the form of steam. The crosslinking mechanism consists of hydrolysis and condensation of the pendant silane groups. Each of these crosslinking procedures has its own benefits and limitations and the properties of the crosslinked products can be markedly different even at the same degree of crosslinking. Accordingly, by selection of different crosslinking methods products having properties suited for particular applications can be obtained. For example, electron beam crosslinking is advantageous for crosslinking of continuous sheet material at very high speeds for subsequent use as the sheet material component, of which greater quantities are normally required. Silane crosslinking results in a more 3-dimensional crosslinked structure which imparts higher tensile properties at temperatures above the crystalline melting point of the polymer. Therefore, at the same degree of crosslink, a silane crosslinked polyolefin or like polymer is often more resistant to being stretched and thinned out than an electron beam cured one. As a result, it is advantageous to use a silane crosslinked closure sheet which can have a lower degree of crosslink than a beam-cured covering sheet material, allowing easier welding of the closure sheet to the covering sheet material without sacrificing resistance to being stretched thin by the retractive forces of the sleeve.

It is a further advantage of the sleeve structures of the invention that the closure sheet may be of a different colour from the covering sheet material. For example, the closure sheet may be transparent or somewhat translucent while the covering sheet material may be opaque. A pattern of thermochromic paint may be applied on the underside of and be visible through the closure sheet, which guides the installer by providing a visual indication, for example a color change, when sufficient heat has been applied so that the temperature needed to achieve a satisfactory weld has been reached. Optionally, should it be desired to employ infra red heating, selected infra red absorptive additives such as copper phthalocyanine which do not substantially impair its transparency may be included in the closure sheet.

Alternatively, the closure sheet may be of a color different from the covering sheet material, for example black, which more effectively absorbs infra-red radiation, for cases in which infra-red heaters are used to weld the wrapped-around sleeve.

Use of a different color can also make it easier for an inspector to determine the location of the closure area. It is frequently recommended that a wrap-around sleeve should be positioned in a specific orientation on a pipe or other article in order to promote filling of the underlap with functional coating material. By having the closure sheet of a color distinctly different from the sheet, an inspector can at a glance determine that, firstly, the sleeve was positioned properly and, secondly, the closure sheet was in fact installed.

Preferably, in order to provide a protective covering with good strength properties, the recovered thickness of the covering sheets and closure sheets, which may be the same or different, are about 0.01 to about 0.2 inches more preferably about 0.02 to about 0.1 inches. In some circumstances it is advantageous to use a closure sheet thinner than the covering sheet in order to reduce the thickness at the overlap area and make it easier to get heat through to a pipe or other article to be covered and to a functional coating which may require heating to achieve its greatest effect. Preferably the closure sheet is about 10 to about 80% thinner than the covering sheet, based on the thickness of the covering sheet, more preferably about 30 to about 60% thinner. Conversely, and especially where the covering sheet material exhibits a high degree of shrinkage, it is advantageous to employ a closure sheet thicker than the covering sheet in order to provide greater resistance to thinning out of the closure sheet as a result of the shrinkage forces. In such case the closure sheet is preferably about 10 to about 80% thicker than the covering sheet, based on the thickness of the covering sheet, more preferably about 20 to about 60% thicker.

Advantageously, the inner side of the covering sheet, that is, the side to be laid against the article to be protected, is lined with a functional coating. The coating may be, for example, a sealant, an adhesive material, a mastic, a grease, or a two-component curable composition. In the case in which the coating is an adhesive, this holds the sleeve more firmly on the article and reduces any tendency for the sleeve to become dislodged from the article. Mastics, when employed, can function both as an adhesive and as a sealant to effect a seal between the covering and the article. Examples of greases which may be employed include water-repellent greases such as silicone greases. These can be particularly useful when forming an insulating covering around telephone cables or electrical splices. Examples of two-component curable compositions which may be employed include heat-curable epoxy or urethane compositions which can form a corrosion-protective layer over the surface of a pipe to which the covering is applied.

Examples of suitable sealants include hot-melt adhesives. Hot-melt adhesives for this purpose are well known in the art. However, as will be apparent to those skilled in the art, many fluid materials, which may be organic or inorganic and which may or may not be crystalline at ambient temperature and are rendered substantially non-crystalline on heat application can be used as the sealant. The important requirement, where adhesive sealant is used. is that it should be capable of flowing during the further heating step so as to allow unrestrained recovery of the sheet, to fill any voids and to effect a seal between the surface of the article and the sleeve as the latter shrinks.

In use, the hold-down adhesive portions perform a function of facilitating welding of the closure sheet to the underlying overlapped or abutting end portions of the covering sheet in a manner somewhat analogous to that performed by the hold-down adhesive described in the Tailor et al U.S. Pat. No. 4,472,468 referred to above. The nature of the hold-down adhesive, and its manner of application and use are described in detail in the Tailor et al patent, which is incorporated herein by reference for its disclosures in the above respects Briefly, the hold-down adhesive performs the function of holding down the ends of the closure sheet on the covering sheet when applied to an article to be protected while the closure sheet is being welded to the covering sheet. If the adhesive is pressure sensitive, the closure sheet is secured to the end portions of the covering sheet merely by pressing the overlapping portions together When heat is first applied to the closure sheet, the adhesive prevents slippage of the adhered together portions as the closure sheet begins to shrink and also prevents the closure sheet from curling and peeling back during the initial heat application. Suitable shear-resistant adhesives are well-known to those skilled in the art.

The preferred materials are iso-butylene polymers, such as polyisobutylene, polybutene, and butyl rubber. These polymers can be partially cured to increase the shear-strength particularly at elevated temperatures. Other isobutylene polymers that are useful include halogenated butyl rubbers, and other modified butyls for example terpolymers in which divinylbenzene is added to impart a cure (e.g. Polysar's XL-20 and XL-50) and filled, plasticised and partially cured masterbatch crumb (e.g. Columbian Carbon's Bucar 5214). An appropriate quantity and grade of poly-isobutylene (Vistanex) may also be used to impart a desired tack (pressure sensitive) property according to the formulation Addition of fillers is useful in adjusting tack and the cohesive strength of the adhesive. The fillers suitable for the application include carbon black, mica, graphite, talc, asbestos, aluminium hydrate, clays, hydrated silicas, calcium silicates, silicate-aluminates, fine furnace and thermal blacks, magnesium carbonate, and calcium carbonate. The preferred fillers, however, are carbon blacks and talcs.

Other adhesive materials useful for the hold-down application include those based on nitrile rubbers, styrene-butadiene rubbers, styrene-isoprene rubbers, neoprenes, polyurethanes, ethylenevinyl acetate, acrylates, (e.g. ethylene-ethyl acrylate), silicones, poly-vinyl-acetate, amino resins, amorphous polypropylenes and polyvinylacetals. These adhesives may be of the hot-melt type, contact cement type, lacquer type, thermosetting adhesive type, pressure sensitive adhesive type, crosslinked adhesives, or two component adhesives. Many variations of adhesive systems used are possible; for example, a pressure sensitive transfer tape with a thin polymeric liner sandwiched between two pressure sensitive adhesive films can be applied so that one adhesive film is bonded to the closure sheet and the adhesive film on the other side can be adhered to the covering sheet (e.g. J-Tape, 266P and other tapes from Adchem Corp. U.S.A.).

The hold-down adhesive may also be a material which is not pressure sensitive at ambient temperatures but which develops pressure-sensitivity when heated. In such case, the adhesive-covered zones may be carefully heated to render the adhesive tacky and bond it to the underlying end portions of the covering sheet. The adhesive may be heated by applying heat directly to the adhesive material before applying the closure sheet to the covering sheet.

The closure sheets may be manufactured from lengths cut longitudinally stretched continuous sheet material which may be of the same width as the covering sheet material with which the closure sheet is to be used. In such case, a discontinuous application method needs to be employed to apply the hold-down adhesive to or adjacent to the opposite transversely extending end edges of the closure sheets. Preferably, however, the closure sheets are formed from transversely stretched continuous sheet material, the continuous sheet material being cut into lengths corresponding to the width of the covering sheet material. This allows continuous application of the hold-down adhesive, for example in the form of double-sided adhesive tape applied longitudinally on the continuous sheet material before it is cut into lengths. The continuous sheet material should in such case, be of a width so that there is sufficient overlap of the closure sheet on the end portions of the covering sheet to form a weld having sufficient strength to withstand the hoop stress resulting from shrinkage of the covering sheet.

Preferably, the closure sheet has a longitudinal dimension (the distance between the end portions carrying the hold-down adhesive portions) of about 2 to about 10 inches, more preferably about 3 to about 6 inches, and the length of the adhesive free zone (between the adhesive portions) is about 1 to about 8 inches, more preferably about 1.5 to about 4 inches.

The covering sheets may be formed by cutting lengths from longitudinally stretched continuous sheet material, normally carrying a functional coating on one side. It is an advantage of the present process that lengths of the covering sheet material may be cut from bulk rolls thereof, for example by the end user, to a longitudinal dimension suited to the girth of the pipe or other article to be covered, without needing to maintain inventories of wrap-around sleeves of differing lengths for different diameters of pipe, and without wasteful usage of over-size sleeves.

The techniques employed for longitudinal or transverse stretch of sheet material in order to stretch them from an original heat stable form to a dimensionally heat unstable form capable of moving in the direction of its original form by the application of heat alone are well known to those skilled in the art and need not be described in detail herein.

An example of the present invention is illustrated in the accompanying drawings in which.

Figure 1:
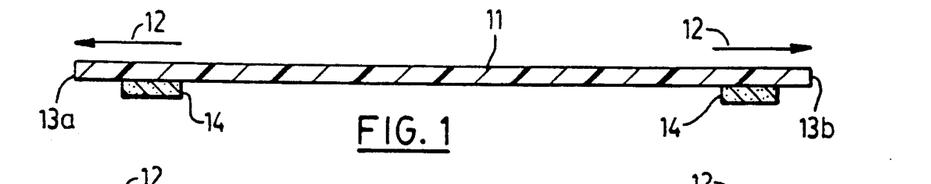
FIG. 1 is a cross-sectional view through a closure sheet taken on the line I—I in FIG. 2.
Figure 2:
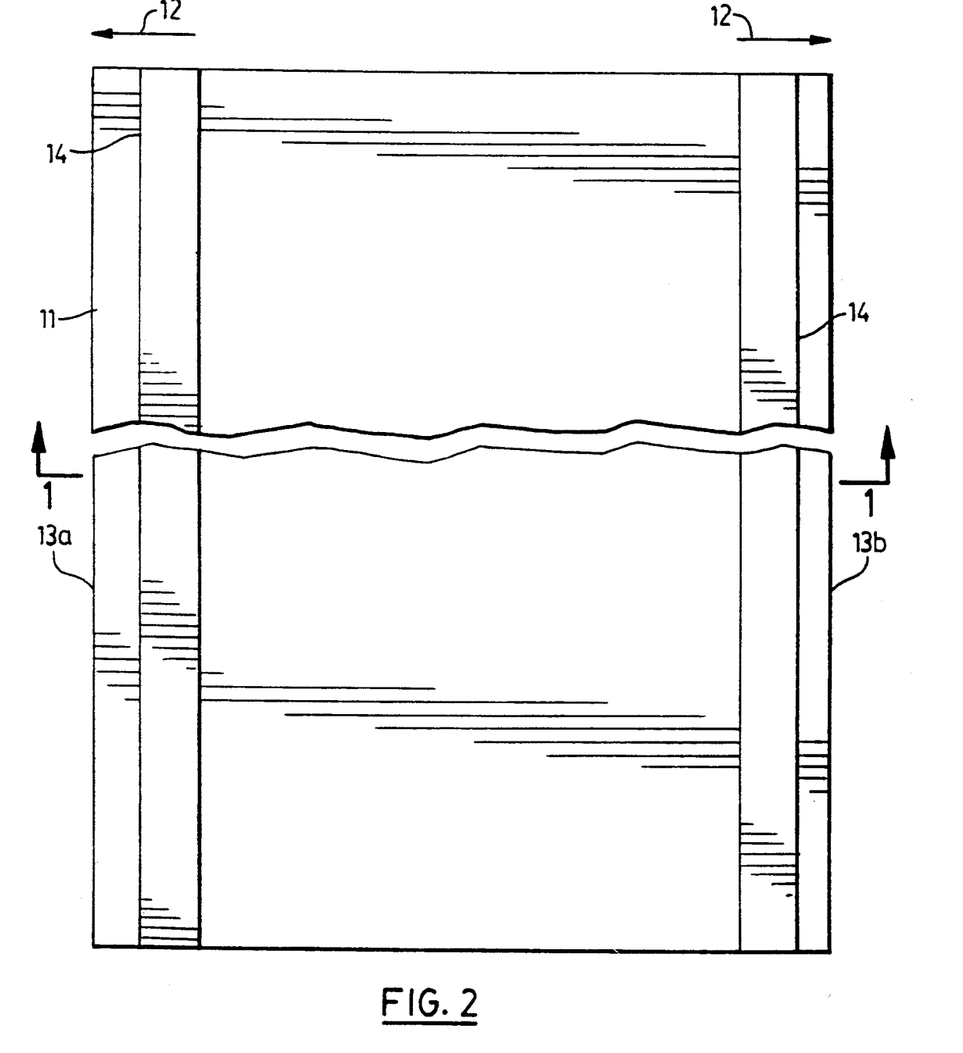
FIG. 2 is a bottom plan view of the closure sheet of FIG. 1.

Referring to the drawings, FIGS. 1 and 2 show a flexible rectangular closure sheet 11 having been stretched in the direction indicated by the arrows 12 so that when heated it recovers its original dimension by shrinking longitudinally in the direction opposite to the arrows 12. Adjacent each longitudinal end 13a and 13b, a strip 14 of hold-down adhesive is applied, preferably spaced inwardly from the adjacent end edge, as shown. The remainder of the underside of the sheet 11 is adhesive free and the bare sheet surface is exposed.

Figure 3:
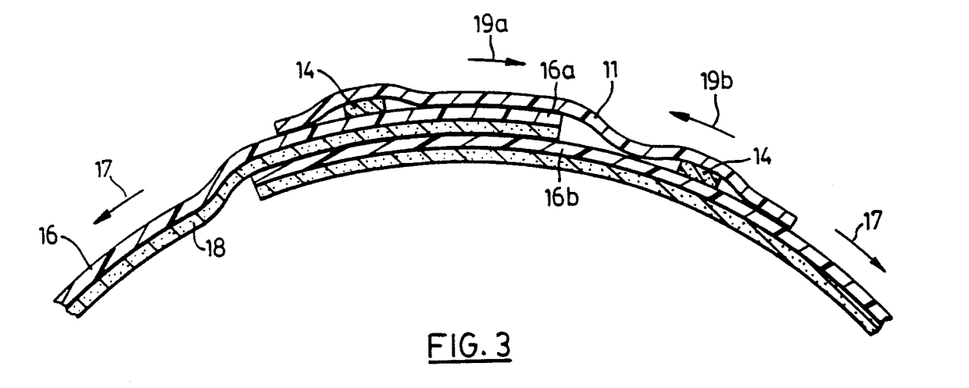
FIG. 3 is a partial transverse cross-section through a wrap-around sleeve having a closure sheet applied on its overlap portion.

FIG. 3 shows the sheet 11 applied on the overlap portion of a flexible heat shrinkable covering sheet or wrap-around sleeve 16 having overlapped end portions 16a and 16b. As will be appreciated, the sleeve may be formed of a sheet having been stretched longitudinally so that on heating it shrinks in the direction indicated by the arrows 17 in FIG. 3. Preferably, the underside of the sleeve 16 is coated with a mastic or other functional coating 18. For ease of depiction, the intermediate portion of the sleeve 16 is not shown in FIG. 3. The sleeve 16 is wrapped around a pipe or other item to be protected (not shown) and is of sufficient length in relation to the girth of the item to allow overlap of the ends 16a and 16b. Initially, the closure 11 is bonded to the ends 16a and 16b by the hold-down adhesive 14, with the closure 11 between the adhesive strips 14 straddling the exposed end edge of the overlap portion 16a. Heat is applied locally to the exterior of the closure 11, for example with a propane torch, causing the sheet 11 to recover in the direction of the arrows 19a and 19b. As a result, the sheet 11 conforms closely to portions 16a and 16b beneath it. The tensile stress transmitted through the adhesive strips 14 causes the sleeve 16 to be drawn more tightly into gripping engagement around the item being protected and the end portion 16a and 16b are pulled and tend to slide over one another in the direction of the arrows 19a and 19b, respectively. At the same time, the bare undersurface of the sheet 11 between the adhesive strips 14 slips longitudinally over the adjacent underlying surfaces of the portion 16a and 16b and softening and bonding (welding) of the material of the sheet 11 to the underlying portions 16a and 16b commences. The remainder of the sleeve 16 is then heated, preferably commencing with the application of localised heating at the region opposite the overlapped ends 16a and 16b and subsequently applying localised heating progressively along one side of the sleeve 16 from the said opposite region toward one of the sleeve end portions 16a and 16b and subsequently progressively along the opposite side of the sleeve 16 from the said opposite region toward the other of the end portions 16a and 16b, so that the functional coating 18, if present, is activated, and the sleeve 16 is shrunk down into tight conformity with the item to be protected. Additional heat is then applied locally to the exterior of the closure to ensure development of the weld. During shrinkage of the sleeve 16, the closure 11 is subjected to tensile forces exerted in the directions of the arrows 17, as a result of the hoop stress generated in the sleeve 16 upon shrinkage, and this contributes to development of a strong welded bond between the closure sheet 11 and the sleeve 16.

Figure 4:
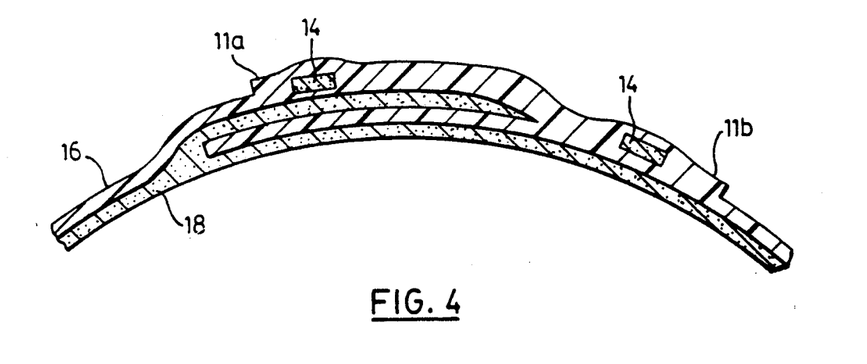
FIG. 4 is a partial transverse cross-section corresponding to FIG. 3 and showing the welded and shrunk down tubular sleeve.

The completed welded tubular sleeve having the ends of the wrap-around sleeve 16 connected together through the fused residue of the closure sheet 11 is shown in FIG. 4.

It will be noted that the hold-down adhesive strips 14 are preferably spaced inwardly from the ends of the closure sheet 11 so that adhesive free longitudinally marginal portions 11a and 11b are exposed which are welded to the sleeve 16 and hence there are no vestigial free end edges remaining from the sheet 11. Such free end edges can render the welded sleeve vulnerable to damage in applications in which it is exposed to soil stress, since there may be a tendency for soil to work its way under the free end edges where the bond strength of the hold-down adhesive 14 is relatively weak as compared with the bond strength of welded together areas of the sheet 11 and sleeve 16.

With less advantage, the closure sheet may be used to connect abutting or adjacent but spaced end portions of a covering sheet wrapped around an article to be covered without overlap of the ends of the covering sheet. In such case the end portions of the closure sheet are applied on the upper sides of the end portions of the covering sheet and the closure sheet is welded to the covering sheet and then the covering sheet shrunk down following the sequence of operations generally as described above with reference to FIGS. 1 to 4.

Although the above description provides ample information to enable one skilled in the art to conduct the present welding methods and to fabricate the welded products, for the avoidance of doubt a detailed Example of the methods in accordance with the invention will be given:

EXAMPLE

A mixture containing 50% by weight extrusion grade low density polyethylene, and 50% by weight extrusion grade ethylene-vinyl acetate copolymer (12% vinyl acetate) was extruded into a sheet with a thickness of 1.2 mm and a width of 60 cm. This sheet was then subjected to an 8 Mrad dose of 2 MeV electrons, resulting in a cure of 60-65% by the solvent extraction gel fraction method. A portion of this sheet was stretched in a direction transverse to the extrusion direction such as to impart a heat recoverability of about 10%. The remainder was stretched longitudinally (i.e in the extrusion direction) such as to impart a heat recoverability of about 25%. The longitudinally stretched sheet was coated on one side with a 1.5 mm (0.06 inch) thick layer of mastic sealant of the type commonly used to protect steel pipes from corroding, and was then cut to form covering sheets of a length of 60 cm (24 inches), such that, when wrapped around a pipe having an outside diameter of 16.8 cm (6.6 inches), an overlap of about 6 cm (2.4 inches), results. The transversely stretched material was cut into strips 10 cm (4 inches) wide and 60 cm (24 inches) long, with the direction of shrinkage in the short dimension. To prepare closure sheets in accordance with this invention, 1 cm (0.4 inches) wide strips of two-sided adhesive tape of the type similar to that used to hold down carpets were applied to these strips lengthwise, 1 cm (0.4 inches) in from each edge. The release paper was left in place.

The product was then installed as follows:

A length of the heat shrinkable sheet was wrapped around a steel pipe joint which had been pre-heated to 65° C., such that the sheet was centered over the girth weld. The release paper was removed from the adhesive strips on a closure sheet, and the closure sheet was bonded to the heat shrinkable covering sheet such that the adhesive strips straddled the exposed end. Using a propane torch, heat was applied first to the closure sheet in long, end-to-end sweeps, causing it to recover and conform to the heat shrinkable covering sheet below it. At this point, sufficient heat was applied to establish a bond between the lower under surface of the closure sheet and the outer surface of the covering sheet. The remainder of the covering sheet was then shrunk, starting in the centre and working out toward the end, and repeating for the other end. Additional heat was then applied to the closure sheet, in sweeping end-to-end strokes to ensure development of a weld to the covering sheet.

After cooling, the covering sheet conformed tightly to the pipe, with no slippage evident between the closure sheet and the heat shrinkable covering sheet. The closure sheet was securely welded to the heat shrinkable covering sheet except under the adhesive strips, as evidenced by the difficulty of peeling the two surfaces apart. During peeling, the failure mode was essentially cohesive, and the force often exceeded the tensile strength of the closure sheet.

We claim:

1. A heat shrinkable closure for a dimensionally heat unstable wrap-around covering, said closure comprising s fusion bondable sheet of flexible material having longitudinally spaced end portions, the material having been stretched from an original heat stable form to a dimensionally heat unstable form capable of moving in the direction of its original form by the application of heat alone, said sheet having on one side to be applied to said covering a hold-down adhesive portion extending across a zone transverse to said direction of stretch and adjacent each said end portion, and an adhesive free zone between said hold down adhesive portions whereby said closure can be applied over adjoining end portions adhesively bonded to the end portions of wrap-around covering and whereby said one side of the closure can be fusion bonded to the upper sides of said end portions of said covering.

2. A closure as claimed in claim 1 wherein each hold-down adhesive portion is spaced inwardly from the adjacent end edge of the closure sheet, whereby marginal portions of said sheet can be welded to the covering.

3. A closure as claimed in claim 1 wherein said closure sheet exhibits on heating a shrinkage of about 2% to about 50%, based on the length of the unshrunk sheet.

4. A closure as claimed in claim 3 wherein said shrinkage is about 2% to about 25%.

5. A closure as claimed in claim 4 wherein said shrinkage is about 5% to about 20%.

6. A closure as claimed in claim 1 wherein said closure sheet is translucent or transparent.

7. A closure as claimed in claim 6 having a thermochromic indicator on said one side of said sheet and visible through said sheet from an opposite side.

8. A closure as claimed in claim 1 wherein said closure sheet comprises a polyolefin, a blend of polyolefins, a blend of a polyolefin with an olefin copolymer or with an elastomer or with a mixture thereof, an elastomer, a thermoplastic elastomer, or a mixture thereof.

9. A closure as claimed in claim 1 wherein said closure sheet is a weld efficient polymer.

10. A closure as claimed in claim 1 wherein said closure sheet material is crosslinked to a degree of about 25% to about 85%.

11. A closure as claimed in claim 10 wherein said closure sheet material is crosslinked to a degree of about 45% to about 70%.

12. A closure as claimed in claim 2 wherein said closure sheet comprises a polyolefin, a blend of polyolefins, a blend of a polyolefin with an olefin copolymer or with an elastomer or with a mixture thereof, an elastomer, a thermoplastic elastomer, or a mixture thereof.

13. A closure as claimed in claim 2 wherein said closure sheet is a weld efficient polymer.

14. A closure as claimed in claim 2 wherein said closure sheet material is crosslinked to a degree of about 25% to about 85%.

15. A closure as claimed in claim 2 wherein said closure sheet material is crosslinked to a degree of about 45% to about 70%.

16. A closure as claimed in claim 1 wherein the recovered thickness of said closure sheet is about 0.01 to about 0.2 inches thick.

17. A closure as claimed in claim 16 wherein said thickness is each about 0.02 to about 0.1 inches.

18. A closure as claimed in claim 1 wherein the hold-down adhesive is a pressure sensitive adhesive.

19. A closure as claimed in claim 18 wherein the hold-down adhesive is an isobutylene polymer, or a blend of isobutylene polymers, with a filler.

20. A closure as claimed in claim 9 wherein the hold-down adhesive is not pressure-sensitive at ambient temperature but develops pressure-sensitivity when heated.

21. A closure as claimed in claim 9 wherein the hold-down adhesive is constituted by a strip of double-sided adhesive transfer tape.

22. A sleeve structure comprising a wrap-around covering and a closure therefor, said covering comprising a sheet of dimensionally heat unstable flexible material having longitudinally spaced end portions capable of being juxtaposed when the covering sheet is applied to an article to be covered, said closure comprising a sheet of flexible material fusion bondable with said covering sheet and having longitudinally spaced end portions, the material of each of the closure sheet and the covering sheet having been stretched in the longitudinal direction from an original dimensionally heat stable form to a dimensionally heat unstable form capable of moving in the direction of its original form by the application of heat alone, said closure sheet having on a side to be applied to said covering a hold-down adhesive portion extending across a transverse zone adjacent each said end portions, and an adhesive free zone between said hold-down adhesive portions whereby said closure can be applied over adjoining end portions of said wrap-around covering with said hold-down adhesive portions adhesively bonded to the end portions of said wrap-around covering and whereby said side of the closure can be fusion bonded to the upper sides of said end portions of said covering.

23. The structure as claimed in claim 22 wherein each hold-down adhesive portion is spaced inwardly from the adjacent end edge of the closure sheet, whereby longitudinally marginal portions of said sheet can be welded to the covering.

24. The structure as claimed in claim 22 wherein said covering sheet exhibits on heating a longitudinal shrinkage of about 20% to about 80% based on the length of the unshrunk sheet.

25. The structure as claimed in claim 22 wherein said closure sheet exhibits on heating a longitudinal shrinkage of about 2% to about 50%, based on the length of the unshrunk sheet.

26. The structure as claimed in claim 25 wherein said shrinkage is about 2% to about 25%.

27. The structure as claimed in claim 26 wherein said shrinkage is about 5% to about 20%.

28. The structure as claimed in claim 22 wherein said closure sheet commences shrinkage at a lower temperature than said covering sheet.

29. The structure as claimed in claim 28 wherein said closure sheet strip commences shrinkage at a temperature about 5° C. to about 15° C. lower than said covering sheet.

30. The structure as claimed in claim 22 wherein said closure sheet is translucent or transparent.

31. The structure as claimed in clain 30 having a thermochromic indicator on said one side of said sheet and visible through said translucent or transparent sheet from an opposite side.

32. The structure as claimed in claim 22 wherein said closure sheet contains a colorant different from a colorant contained in said covering sheet.

33. The structure as claimed in claim 22 wherein said closure sheet and said covering sheet are of different chemical composition and each is a polyolefin, a blend of polyolefins, a blend of a polyolefin with an olefin copolymer or with an elastomer or with a mixture thereof, an elastomer, a thermoplastic elastomer, or a mixture thereof.

34. The structure as claimed in claim 22 wherein said closure sheet is a weld efficient polymer and said covering sheet is a polyolefin, a blend of polyolefins, a blend of a polyolefin with an olefin copolymer or with an elastomer or with a mixture thereof, an elastomer, a thermoplastic elastomer, or a mixture thereof.

35. The structure as claimed in claim 22 wherein said covering sheet material is crosslinked to a degree of about 25% to about 85%.

36. The structure as claimed in claim 35 wherein said closure sheet is crosslinked to a degree lower than said covering sheet.

37. The structure as claimed in claim 35 wherein said covering sheet material is crosslinked to a degree of about 45% to about 70%.

38. The structure as claimed in claim 37 wherein said closure sheet is crosslinked to a degree lower than said covering sheet.

39. The structure as claimed in claim 22 wherein the recovered thickness of said covering sheet and said closure sheet are each about 0.05 to about 0.2 inches thick.

40. The structure as claimed in claim 39 wherein said thicknesses are each about 0.02 to about 0.1 inches.

41. The structure as claimed in claim 22 wherein said covering sheet material has a functional coating on its inner side.

42. The structure as claimed in claim 41 wherein said functional coating is a sealant or an adhesive material.

43. The structure as claimed in claim 22 wherein the hold-down adhesive is a pressure sensitive adhesive.

44. The structure as claimed in claim 43 wherein the hold-down adhesive is an isobutylene polymer, or a blend of isobutylene polymers, with a filler.

45. The structure as claimed in claim 22 wherein the hold-down adhesive is not pressure-sensitive at ambient temperature but develops pressure-sensitivity when heated.

46. The structure as claimed in claim 43 wherein the hold-down adhesive is constituted by a strip of double-sided adhesive transfer tape.

47. The structure as claimed in claim 39 wherein said closure sheet is about 10 to about 80% thinner than said covering sheet, based on the thickness of the covering sheet.

48. The structure as claimed in claim 39 wherein said closure sheet is about 30 to about 60% thinner than said covering sheet based on the thickness of the covering sheet.

49. The structure as claimed in claim 39 wherein said closure sheet is about 10 to about 80% thicker than said covering sheet, based on the thickness of the covering sheet.

50. The structure as claimed in claim 39 wherein said closure sheet is about 30 to bout 60% thicker than said covering sheet, based on the thickness of the covering sheet material.

51. The structure as claimed in claim 22 wherein said covering sheet has been crosslinked by a method different from a method by which said closure sheet has been cross linked.

52. A method of applying a close fitting protective covering to an article to be covered, comprising providing a covering sheet and a closure sheet each having longitudinal end portions and each having been stretched in the longitudinal direction from an original heat stable form to a dimensionally heat unstable form capable of moving in the direction of its original form by the application of heat alone, said closure sheet having on one side a hold-down adhesive portion extending across a transverse zone adjacent each end portion and an adhesive free zone between the hold-down adhesive portions, wrapping the covering sheet around the article by laying the sheet against the article and juxtaposing its end portions, applying the closure sheet to said covering sheet with its adhesive free zone spanning said end portions and bonding the hold-down adhesive covered portions on said end portions, respectively, heating the closure sheet to effect a fusion bond between the adhesive free zone of the closure sheet and said end portions of the covering sheet, and heating the covering sheet to shrink it into close fitting relation to the article.

53. A method as claimed in claim 52 wherein the end portions of the covering sheet are butted together on the article to be covered.

54. A method as claimed in claim 52 wherein the end portions of the covering sheet are overlapped on the article to be covered.

55. A method as claimed in claim 52 wherein the covering sheet is heated by applying heat locally at the region opposite the closure sheet and then progressively along the covering sheet toward the closure sheet.

56. The structure as claimed in claim 22 wherein said covering sheet has different dimensional heat stability from said closure sheet.

57. The structure as claimed in claim 22 wherein said covering sheet has different color from said closure sheet.

58. The structure as claimed in claim 22 wherein said covering sheet has different chemical composition from said closure sheet.

59. The structure as claimed in claim 22 wherein said covering sheet has different degree of crosslinking from said closure sheet.

60. The structure as claimed in claim 22 wherein said covering sheet has different thickness from said closure sheet.

61. The structure as claimed in claim 51 wherein said crosslinking methods are selected from the group consisting of exposure to ionizing radiation, blending with organic peroxides, and formation of a polymer containing pendant silane groups and exposure to moisture to crosslink said silane groups.

* * * * *

UNITED STATES PATENT AND TRADEMARK OFFICE
CERTIFICATE OF CORRECTION

PATENT NO. : 5,175,032
DATED : December 29, 1992
INVENTOR(S) : Robert E. Steele, et al It is certified that error appears in the above-indentified patent and that said Letters Patent is hereby corrected as shown below:

Col. 11, line 63, delete "s", insert -- a --.

Col. 12, line 6, after "portions" (first occurrence), insert -- of said wrap-around covering with said hold-down adhesive portions --;

after "of", insert -- said --.

Signed and Sealed this

Third Day of May, 1994

*Attest:*

BRUCE LEHMAN

*Attesting Officer*     *Commissioner of Patents and Trademarks*